(12) United States Patent
Morgan et al.

(10) Patent No.: US 10,012,318 B2
(45) Date of Patent: Jul. 3, 2018

(54) SHUTTLE VALVE STABILIZATION THROUGH PRESSURE DIFFERENTIAL AND SHUTTLE VALVE WITH HOLLOW POPPET WITH WEEP HOLE

(71) Applicant: Parker-Hannifin Corporation, Cleveland, OH (US)

(72) Inventors: Aaron Michael Morgan, Richfield, OH (US); Kevin Lawrence Bresnahan, Avon Lake, OH (US); Tyler James Kooser, Newbury, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 130 days.

(21) Appl. No.: 15/075,853

(22) Filed: Mar. 21, 2016

(65) Prior Publication Data

US 2016/0281865 A1    Sep. 29, 2016

Related U.S. Application Data

(60) Provisional application No. 62/137,275, filed on Mar. 24, 2015.

(51) Int. Cl.
*F16K 11/044* (2006.01)

(52) U.S. Cl.
CPC ..... *F16K 11/044* (2013.01); *F15B 2211/3052* (2013.01); *Y10T 137/2567* (2015.04); *Y10T 137/2572* (2015.04)

(58) Field of Classification Search
CPC ......... Y10T 137/2567; Y10T 137/2569; Y10T 137/2572; F15B 2211/3052; F16K 11/044

USPC .......................................... 137/112, 113, 114
See application file for complete search history.

(56) References Cited

U.S. PATENT DOCUMENTS

| | | | | |
|---|---|---|---|---|
| 2,305,519 A * | 12/1942 | Dunmire | ................ | F16K 17/06 137/115.06 |
| 2,445,505 A * | 7/1948 | Ashton | ................ | F16K 11/065 137/113 |
| 2,569,967 A * | 10/1951 | Ashton | ................ | B64C 25/22 137/113 |
| 2,651,491 A * | 9/1953 | Ashton | ................ | F15B 13/02 137/112 |
| 2,735,696 A * | 2/1956 | Omon | ................ | F16L 37/23 137/540 |
| 3,139,180 A * | 6/1964 | Kobernick | ................ | A61C 5/66 206/220 |

(Continued)

*Primary Examiner* — William McCalister
(74) *Attorney, Agent, or Firm* — McDonnell Boehnen Hulbert & Berghoff LLP (57) ABSTRACT

A shuttle valve has a valve body including a first valve seat defining a first fluid inlet, a second valve seat defining a second fluid inlet, and a center portion that is connected to the valve seats, the center portion defining a fluid outlet and a bore. A moveable member is moveable within the bore between a first position against the first valve seat and a second position against the second valve seat to control the flow of fluid from either of the first or second inlet to the outlet. The moveable member may be configured to have a unitary construction formed of a single component, by which a unitary shell defines a substantially hollow interior. The moveable member has a hollow interior and a weep hole for equalizing pressure between the hollow interior and exterior of the moveable member.

7 Claims, 6 Drawing Sheets

(56) References Cited

U.S. PATENT DOCUMENTS

| | | | | |
|---|---|---|---|---|
| 3,151,624 A * | 10/1964 | Koutnik | F16K 11/161 137/112 |
| 3,270,766 A * | 9/1966 | Stone | F02K 9/82 137/246.22 |
| 3,521,015 A * | 7/1970 | Steward | H01H 13/12 200/248 |
| 3,917,062 A * | 11/1975 | Winters | A61C 5/66 206/219 |
| 3,921,666 A * | 11/1975 | Leiber | B60T 8/17613 137/557 |
| 4,039,125 A * | 8/1977 | Botnick | G05D 23/1313 137/98 |
| 4,182,447 A * | 1/1980 | Kay | A61C 5/66 206/220 |
| 4,253,481 A * | 3/1981 | Sarlls, Jr. | F16K 11/044 137/112 |
| 4,343,601 A * | 8/1982 | Thorson | F01C 20/20 137/112 |
| 4,461,454 A * | 7/1984 | Vadnais | B05C 17/002 222/521 |
| 4,557,376 A * | 12/1985 | Probst | B65D 81/32 206/219 |
| 4,779,245 A * | 10/1988 | Chelminski | G01V 1/137 181/120 |
| 4,813,454 A * | 3/1989 | Smith, III | F16L 37/32 137/236.1 |
| 5,240,023 A * | 8/1993 | Shelef | F16L 37/22 137/15.09 |
| 5,297,860 A * | 3/1994 | Nakamura | B60T 8/4241 137/102 |
| 5,482,077 A * | 1/1996 | Serafin | F04B 53/1022 137/516.25 |
| 5,944,190 A * | 8/1999 | Edelen | G21F 5/015 206/524.4 |
| 6,223,762 B1 * | 5/2001 | Ghaeli | C10L 3/003 137/205.5 |
| 6,921,113 B1 * | 7/2005 | Vlasblom | B29C 45/006 141/348 |
| 7,275,563 B2 * | 10/2007 | Tiberghien | F16L 29/04 137/614.04 |
| 8,397,742 B2 * | 3/2013 | Thrash | F16K 11/044 137/111 |
| 2004/0104247 A1* | 6/2004 | Anderson | B65D 51/2835 222/83 |
| 2015/0362083 A1* | 12/2015 | Patterson | F16K 11/044 137/12 |

\* cited by examiner

SHUTTLE VALVE STABILIZATION THROUGH PRESSURE DIFFERENTIAL AND SHUTTLE VALVE WITH HOLLOW POPPET WITH WEEP HOLE

RELATED APPLICATIONS

This application claims the benefit of U.S. Provisional Application No. 62/137,275 filed Mar. 24, 2015, which is incorporated herein by reference.

FIELD OF INVENTION

The present invention relates to shuttle valves, including shuttle valves for hydraulic fluid systems, such as, for example, shuttle valves which may be employed in undersea drilling operations in offshore drilling rig blowout preventers.

BACKGROUND OF THE INVENTION

As demand for crude oil and other fossils fuels has increased, the use of undersea drilling operations has expanded. Such operations, however, present an environmental risk in that catastrophic failure in drilling equipment could result in dangerous emission of oil leaking into the undersea environment. As a safety mechanism, undersea drilling operations typically are equipped with blowout preventers. In the event of a catastrophic failure of drilling equipment, the blowout preventers are triggered, which incorporate wedge-like blocking components that drive into the drill stream to cut off flow, thereby preventing leakage into the environment.

The blowout preventers typically are powered using high pressure accumulators, with the flow of the hydraulic fluid being controlled by valve systems. Such valve systems typically may employ hydraulic shuttle valves. A hydraulic shuttle valve generally includes a valve body having a bore with two fluid inlets, one fluid inlet each on opposite ends of the bore. There also is a fluid outlet perpendicular to the bore and between the two fluid inlets. A moveable member rides in the bore of the valve body, and shifts position between two stops or valve seats in the valve body based on the pressures that occur at the two fluid inlets. The movable member will shift when there is a pressure differential between the two fluid inlets to create a net force to shift the moveable member against one of the valve seats, depending upon the direction of the pressure differential. The movable member will reach a physical stop on either side of the bore when the moveable member comes in contact with one of the valve seats. Each valve seat may be integrated into an end cap, or constitute a separate component.

A shuttle valve generally is used as a junction between two separate upstream circuits and a single downstream function. In the case of a blowout preventer in an undersea drilling operation, for example, the two upstream circuits are separate control pods for sourcing hydraulic fluid that are required for redundancy in case of a failure of one of the circuits. Hydraulic fluid will flow in through one of the fluid inlets and then out through the common fluid outlet to actuate a downstream function, such as a large hydraulic cylinder or shear ram in order to seal off the well head and prevent a blowout.

When the hydraulic cylinder retracts, a condition arises where hydraulic fluid will be flowing in the reverse direction, in through the fluid outlet of the shuttle valve, and the reverse flow needs to evacuate through one of the two fluid inlets. During this condition, the shuttle valve must remain biased towards one of the valve seats, for if the movable member were to shift to an intermediate position, the flow area would be reduced resulting in a lower flow rate and ultimately a slower cylinder retraction time. In addition, an intermediate position can lead to an undesirable state of unstable "chatter", in which the moveable member rapidly moves back-and-forth between the two valve seats. Chattering also reduces the reverse flow rate for cylinder retraction, and increases wear on the shuttle valve due to the repeated impacts of the moveable member against the valve seats.

Shuttle valve stabilization, therefore, is important to maintain an efficient bias state of the moveable member towards one of the valve seats during the reverse flow. Conventional configurations for achieving such bias have significant drawbacks. Certain solutions attempt to maintain the moveable member captive in one of the valves seats during the reverse flow. This typically requires that the reverse flow actually be forced through the moveable member itself, which minimizes flow area. Other conventional configurations have used o-rings or similar components to provide friction to hold the moveable member toward the valve seats. Such configurations, however, restrict the movement of the moveable member generally, thereby undesirably increasing the requisite operating flows and pressures. Such configurations further add a component to the valve system, which in some cases can fail resulting in undesired and potentially catastrophic system contamination.

Conventional shuttles valves have thus proven deficient in providing a maximum reverse flow rate for hydraulic cylinder retraction, while preventing the centering of the moveable member in an intermediate state and unstable chattering.

SUMMARY OF THE INVENTION

The present invention provides an enhanced shuttle valve configuration for biasing a moveable member against a valve seat during the reverse flow of a fluid, for example hydraulic fluid that powers a hydraulic cylinder. The configuration of the present invention stabilizes the movable member during reverse flow conditions, while also reducing the pressure differential across the shuttle valve without increasing the amount of flow required to shift the movable member of the shuttle valve.

The configuration of the present invention provides an enhanced relationship of the geometries of the movable member and valve body as the moveable member shifts within the bore. One or more pressure differential grooves are machined into an outermost diameter of the movable member. The grooves are machined less than the entire length of the outer diameter so as not to create a flow path across the shuttle valve. Additionally, one or a plurality of annuluses or cavities are machined into the bore of the body directly in plane with a center axis of the fluid outlet of the shuttle valve and symmetrical to either side. When a cylinder retracts creating a reverse flow condition, hydraulic fluid surrounds the movable member by traveling through the cavities, which in turn feeds the hydraulic fluid into the pressure differential grooves. The velocity of the hydraulic fluid that enters a pressure differential groove is dependent on the specific location of the moveable member relative to the downstream fluid inlets.

During a reverse flow scenario, with the shuttle valve moveable member already initially biased towards one fluid inlet (the closed fluid inlet), the accompanying end of the pressure differential grooves has no path for the fluid to escape and therefore creates a stagnant flow (higher pressure) area. The opposite end of the pressure differential grooves has a flow path from the fluid outlet downstream to the open fluid inlet, creating a high velocity flow (low pressure) area. This differential in pressure will create a net force towards the biased fluid inlet, which in turn stabilizes the moveable member and maximizes the flow area for the reverse flow. The result is an enhanced configuration having a larger reverse flow area and smaller pressure drop as compared to conventional configurations, while maintaining the movable member stable during the reverse flow conditions.

An aspect of the invention is a shuttle valve. Another aspect of the invention is a moveable member for use in the shuttle valve.

In exemplary embodiments, the shuttle valve may include a valve body having a first valve seat defining a first fluid inlet, a second valve seat defining a second fluid inlet, and a center portion that is connected to the first valve seat and the second vale seat, the center portion defining a fluid outlet and a bore. A moveable member is moveable within the bore between a first position against the first valve seat and a second position against the second valve seat. When the moveable member is in the first position, the second fluid inlet is in fluid communication with the fluid outlet, and when the moveable member is in the second position, the first fluid inlet is in fluid communication with the fluid outlet. The moveable member has at least one groove formed in an outer diameter portion of the moveable member, and during a reverse flow condition in which fluid flows from the fluid outlet, fluid flows into the at least one groove to bias the moveable member against either the first valve seat or the second valve seat.

The shuttle valve further may include a first cavity and a second cavity in fluid communication with the fluid outlet. When the moveable member is in the first position, the second fluid inlet is in fluid communication with the second cavity to permit a reverse flow between the second cavity and the second fluid inlet, thereby creating a high velocity flow area at one end of the at least one groove adjacent the second fluid inlet. Furthermore, when the moveable member is in the first position, the moveable member blocks a reverse flow between the first cavity and the first fluid inlet, thereby creating a stagnant flow area in an end of the at least one groove adjacent the first fluid inlet. A pressure differential between the high velocity flow area and the stagnant flow area biases the moveable member against the first valve seat.

Similarly, when the moveable member is in the second position, the first fluid inlet is in fluid communication with the first cavity to permit a reverse flow between the first cavity and the first fluid inlet, thereby creating a high velocity flow area at the end of the at least one groove adjacent the first fluid inlet. Furthermore, when the moveable member is in the second position, the moveable member blocks a reverse flow between the second cavity and the second fluid inlet, thereby creating a stagnant flow area in the end of the at least one groove adjacent the second fluid inlet. A pressure differential between the high velocity flow area and the stagnant flow area biases the moveable member against the second valve seat.

In exemplary embodiments, the moveable member may include a plurality of grooves spaced equidistantly about a circumference of the moveable member. The grooves may extend less than an entire length of the outer diameter of the moveable member so as not to form a complete flow path over the moveable member. The moveable member may have a substantially hollow interior for reduction of weight and reduction in impacting shock loads induced by the moveable member, and a weep hole for equalizing pressure between the hollow interior and an exterior of the moveable member.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale. In addition, although the present invention at times is described with respect to an exemplary usage of controlling hydraulic fluid flow to and from a hydraulic cylinder, and for an undersea drilling blowout preventer in particular, it will be appreciated that the present invention is not limited to any specific usage. Rather, the present invention may be utilized in any suitable application in which shuttle valves are employed.

Figure 1:
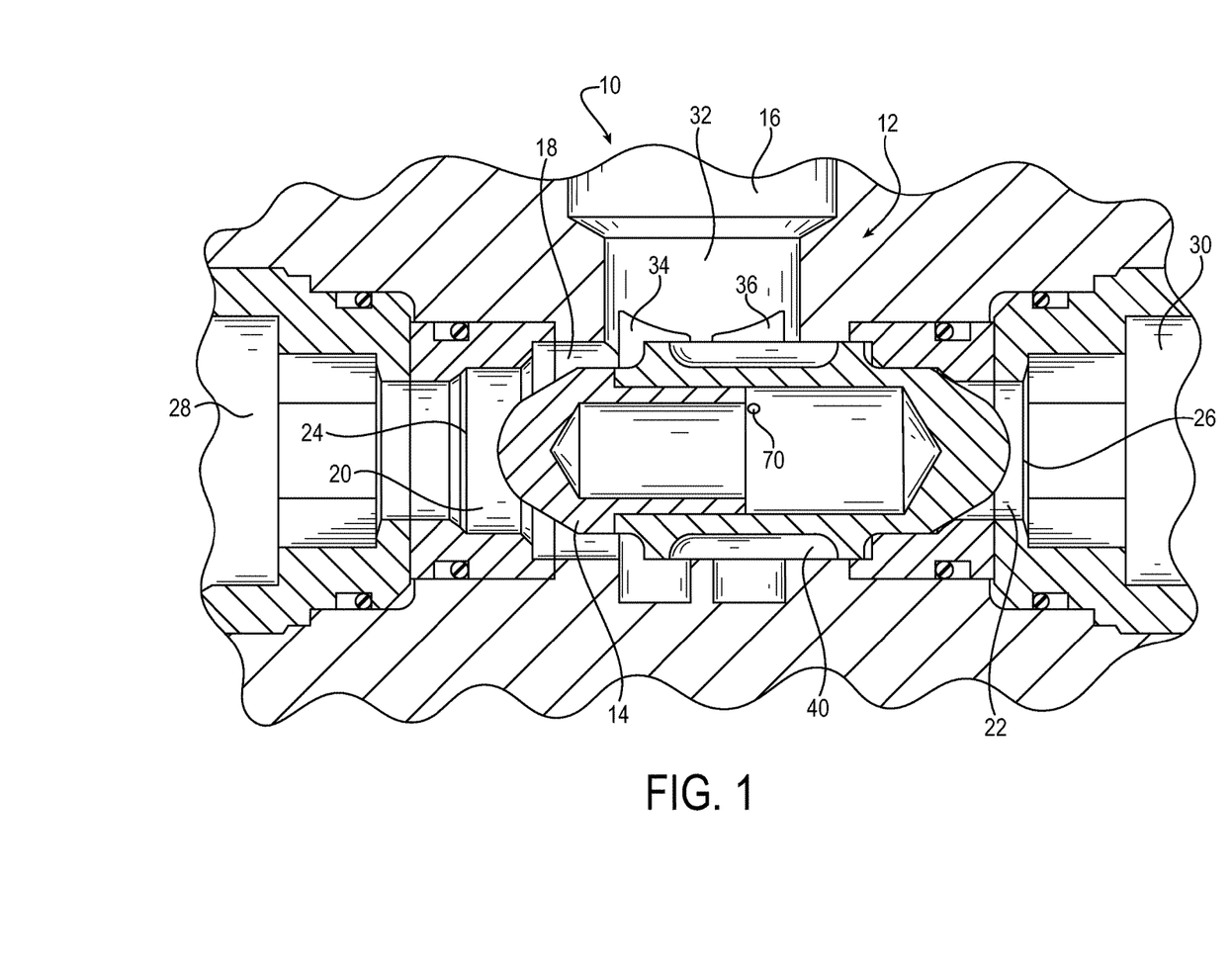
FIG. 1 is a drawing depicting a side cross-sectional view of an exemplary shuttle valve in accordance with embodiments of the present invention.

FIG. 1 is a drawing depicting a side cross-sectional view of an exemplary shuttle valve 10 in accordance with embodiments of the present invention. The shuttle valve 10 includes a valve body 12, and a moveable member 14 that is moveable within the valve body. More specifically, the valve body 12 includes a center portion 16 that has a bore 18 in which the moveable member moves. The moveable member and the components of the valve body may be made of various metals, rigid plastics, and other suitable materials as are known in art for use in shuttle valves. Components of the valve body and moveable member may be made of the same materials, or be made of different materials. On opposite sides of the center portion 16, the valve body further includes a first valve seat 20 and a second valve seat 22. The first valve seat 20 defines a first fluid inlet 24, and the second valve seat 22 defines a second fluid inlet 26. The shuttle valve structure is secured and supported by providing a first end cap 28 connected to the first valve seat 20, and a second end cap 30 connected to the second valve seat 22. The center portion 16 further defines a fluid outlet 32 that is perpendicular to the bore 18. The fluid outlet 32 is in fluid communication with either of the first fluid inlet 24 or second fluid inlet 26, depending upon the position of the moveable member 14.

The shuttle valve 10 may provide for control of a fluid flow through the valve, such as for example a control of hydraulic fluid. As is conventional, the moveable member 14 rides in the bore 18 of the valve body 12, and shifts position between two stops constituting the valve seats 20 and 22 in the valve body based on the pressures that occur at the two fluid inlets. The movable member will shift when there is a pressure differential between the two fluid inlets 24 and 26 to create a net force to shift the moveable member against one of the valve seats, depending upon the direction of the pressure differential. The movable member will reach a physical stop on either side of the bore 18 when the moveable member comes into contact with or against one of the valve seats 20 and 22.

The positioning of the moveable member 14 within the bore 18 controls the fluid flow through the shuttle valve. For example, when the pressure differential forces the moveable member 14 against the first valve seat 20, the second fluid inlet 26 and the fluid outlet 32 are in fluid communication to permit a forward fluid flow through the second fluid inlet 26 and then through the fluid outlet 32. Similarly, when the pressure differential forces the moveable member 14 against the second valve seat 22, the first fluid inlet 24 and the fluid outlet 32 are in fluid communication to permit a forward fluid flow through the first fluid inlet 24 and then through the fluid outlet 32. As referenced above, the forward fluid flow from either fluid inlet and through the fluid outlet may provide fluid for a downstream function, such as providing a flow of hydraulic fluid to power a hydraulic cylinder.

Figure 2:
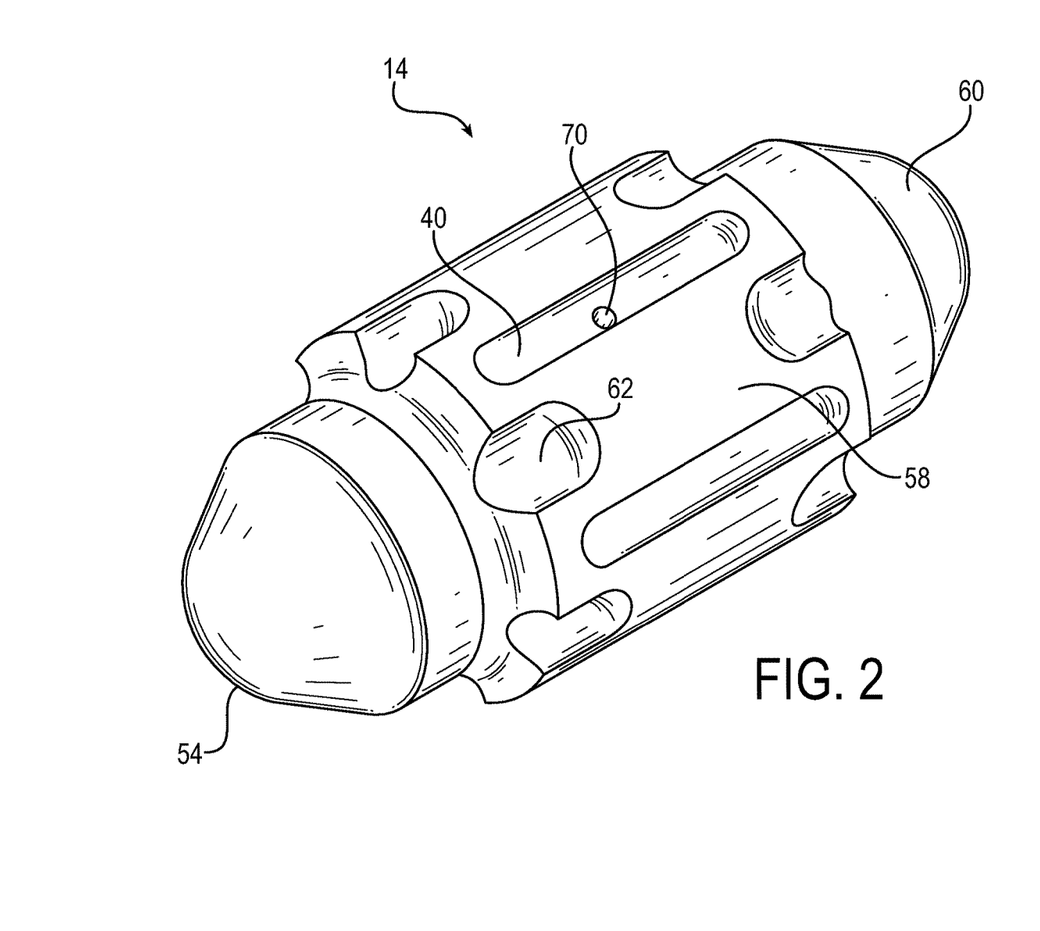
FIG. 2 is a drawing depicting a perspective view of an exemplary moveable member for use in the shuttle valve of FIG. 1.

As referenced above, the present invention provides an enhanced shuttle valve configuration for biasing the moveable member against one of the valve seats during a reverse flow of the fluid, such as, for example, the reverse flow of hydraulic fluid during retraction of the referenced hydraulic cylinder. The biasing of the moveable member during reverse flow may be described with reference to FIG. 1 in combination with FIG. 2. FIG. 2 is a drawing depicting a perspective view of an exemplary moveable member 14 for use in the shuttle valve of FIG. 1.

As seen in FIG. 1, the fluid outlet 32 in the center portion 16 may include one or more annuluses or cavities that define distinct flow paths. In the example of FIG. 1, the fluid outlet may include a first cavity 34 and a second cavity 36. The cavities may be machined into the valve body and be located directly in plane with a center axis of the fluid outlet 32 of the shuttle valve and symmetrical to either side as seen in FIG. 1. The cavities 34 and 36 may be configured with a depth and width as warranted for accommodating the outer diameter of the moveable member and other dimensions of the shuttle valve components. In a forward flow state, the first cavity 34 communicates fluid through the shuttle valve that flows from the first fluid inlet 24 to the fluid outlet 32, and the second cavity 36 communicates fluid through the shuttle valve that flows from the second fluid inlet 36 to the fluid outlet 32. The two cavities provide distinct and isolated fluid pathways that are not in fluid communication with each other in the area of the moveable member 14. In the state of the shuttle valve as depicted in FIG. 1, the moveable member 14 is against the second valve seat 22. In such state, fluid flow (forward or reverse) can occur between the first fluid inlet 24 and the first cavity 34. The moveable member, however, blocks any fluid flow between the second fluid inlet 26 and the second cavity 36. Under different circumstances of operation, the pressure differential between the fluid inlets alternatively may force the moveable member 14 against the first valve seat 20. It will be appreciated that in such state, fluid flow (forward or reverse) can occur between the second fluid inlet 26 and the second cavity 36. The moveable member, however, blocks any fluid flow between the first fluid inlet 24 and the first cavity 34.

As best depicted in FIG. 2 (and depicted partially in FIG. 1), the moveable member 14 may include at least one or a plurality of pressure differential grooves 40 formed in an outer diameter portion of the moveable member. The grooves 40 are machined to extend less than the entire length of the outer diameter so as not to create a flow path across the shuttle valve. The depths of the grooves may be configured as warranted for accommodating the outer diameter and/or other dimensions of the moveable member. In the example of FIG. 2, there are six grooves 40, and the grooves are spaced equidistantly about a circumference of the moveable member. The precise number of grooves may vary depending upon the dimensions of the moveable member and overall shuttle valve. For example, four grooves may be employed for small configurations, eight grooves may be employed for larger configurations, and so on. In general, the higher the number of grooves, the larger the pressure differential created across the moveable member.

Looking at the state of FIG. 1, as referenced above in this state the moveable member 14 is forced against the second valve seat 22, such state initially being created due to the pressure differential of the forward fluid flow. When a cylinder retracts creating a reverse flow condition, fluid (e.g., hydraulic fluid) surrounds the movable member 14 by traveling through the cavities 34 and 36, which in turn feeds the fluid into the pressure differential grooves 40. The velocity of the hydraulic fluid that flows through a pressure differential groove 40 will be dependent upon the specific location of the moveable member between a first position and a second position relative to either of the reverse flow downstream fluid inlets 24 or 26 and against the valve seats 20 or 22.

During the reverse flow scenario as depicted in FIG. 1, with the moveable member already initially forced against the second valve seat 22 (closing the second fluid inlet 26 in this state), the corresponding end of the pressure differential grooves 40 have no path for the fluid to escape between the second cavity 36 and the second fluid inlet 26. This creates a stagnant flow (higher pressure) area at an end of the grooves adjacent to the second fluid inlet 26. The opposite ends of the pressure differential grooves 40 have an open flow path from the first cavity 34 of the fluid outlet downstream to the open first fluid inlet 24, creating a high velocity flow (low pressure) area at an end of the groove adjacent the first fluid inlet 24. A pressure differential is thereby created between the high velocity flow area and the stagnant flow area, and this pressure differential will create a net force that biases the moveable member against the second valve seat 22. This bias stabilizes the moveable member 14 and maximizes the flow area for the reverse flow through the first cavity 34 and out of the first fluid inlet 24.

It will be appreciated that opposite bias control of the moveable member 14 occurs when the moveable member is forced against the first valve seat 20 due to the pressure differential initially created by the forward fluid flow. In such state, when the cylinder retracts creating the reverse flow condition, the ends of the pressure differential grooves 40 have no path for the fluid to escape between the first cavity 34 and the first fluid inlet 24. This creates a stagnant flow (higher pressure) area at the end of the grooves adjacent the first fluid inlet 24. The opposite end of the pressure differential grooves 40 now have an open flow path from the second cavity 36 of the fluid outlet downstream to the now open second fluid inlet 26, creating a high velocity flow (low pressure) area at the end of the grooves adjacent the second fluid inlet 26. A pressure differential is thereby created between the high velocity flow area and the stagnant flow area, and this pressure differential will create a net force that biases the moveable member against the first valve seat 20. This bias similarly stabilizes the moveable member 14 and maximizes the flow area for the reverse flow through the second cavity 36 and out of the second fluid inlet 26.

The result is an enhanced configuration having a larger reverse flow area and smaller pressure drop as compared to conventional configurations, while maintaining the moveable member stable during the reverse flow conditions. The groove/cavity relationship renders the shuttle valve capable operating with a lower pressure drop through the valve without increasing the flow required to shift the moveable member. It is advantageous to have the lowest pressure drop possible through the valve because the pressure drop directly correlates to the amount of flow that can go through the valve in a given amount of time. A low pressure drop through the valve equates to more flow through the valve and faster cycle times for the downstream cylinders and actuators. Particularly for undersea drilling operations, there may be, for example, emergency instances for a blowout preventer when the cylinders will have to be actuated by a remote operated vehicle (ROV). An ROV does not have the same flow capabilities as the hydraulic fluid control pods of the drilling equipment, which makes it important for the shuttle valve to be able to actuate under low flow conditions. The groove/cavity configuration is advantageous in creating a larger flow path, lowering the pressure drop only to the open fluid inlet. The full outside diameter of the moveable member is still present at the closed off fluid inlet with only the bore/moveable member leakage increasing the required flow to shift. None of these performance advantages are as effectively achieved by any of the conventional configurations.

Figure 3:
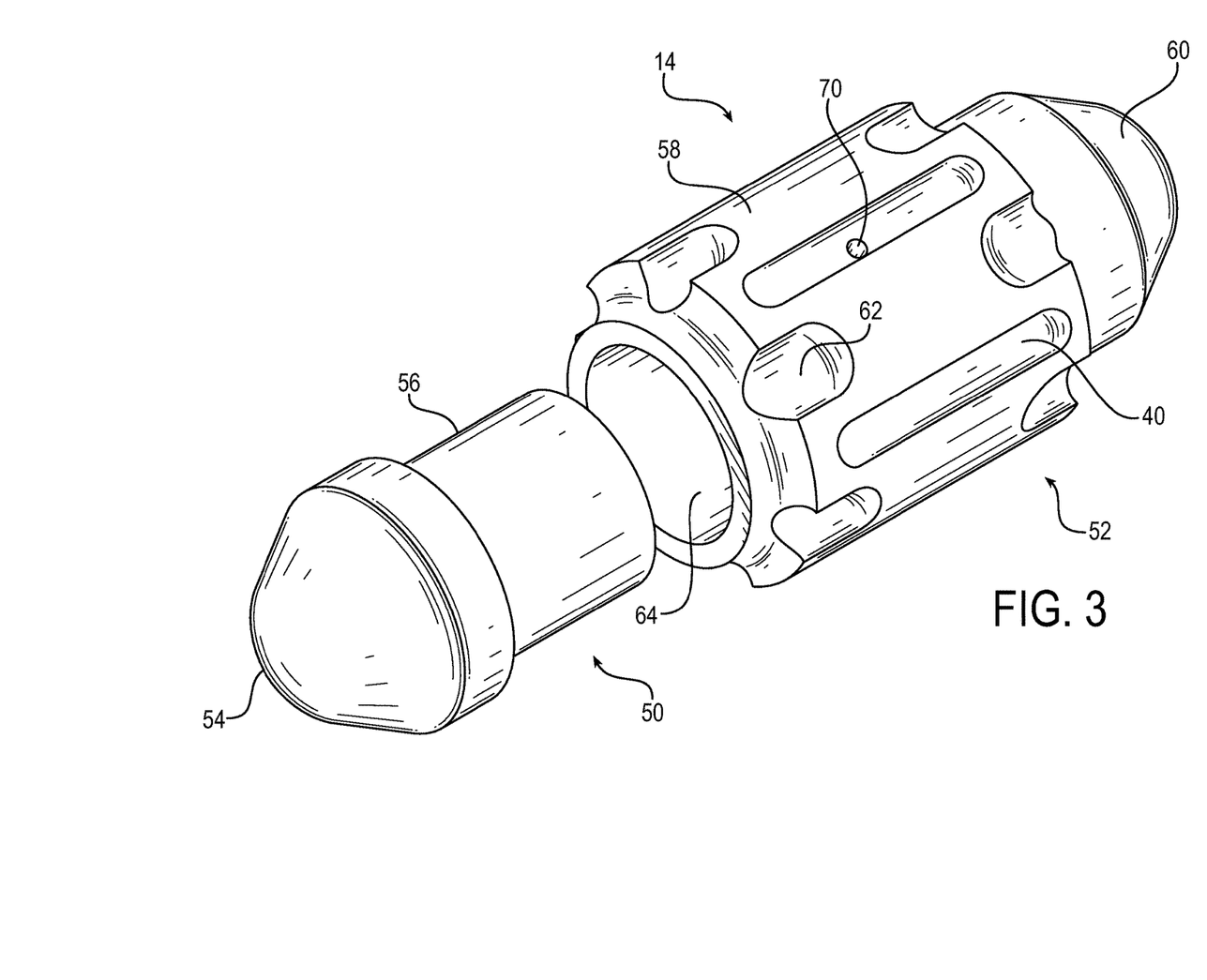
FIG. 3 is a drawing depicting an exploded perspective view of the moveable member of FIG. 2.
Figure 4:
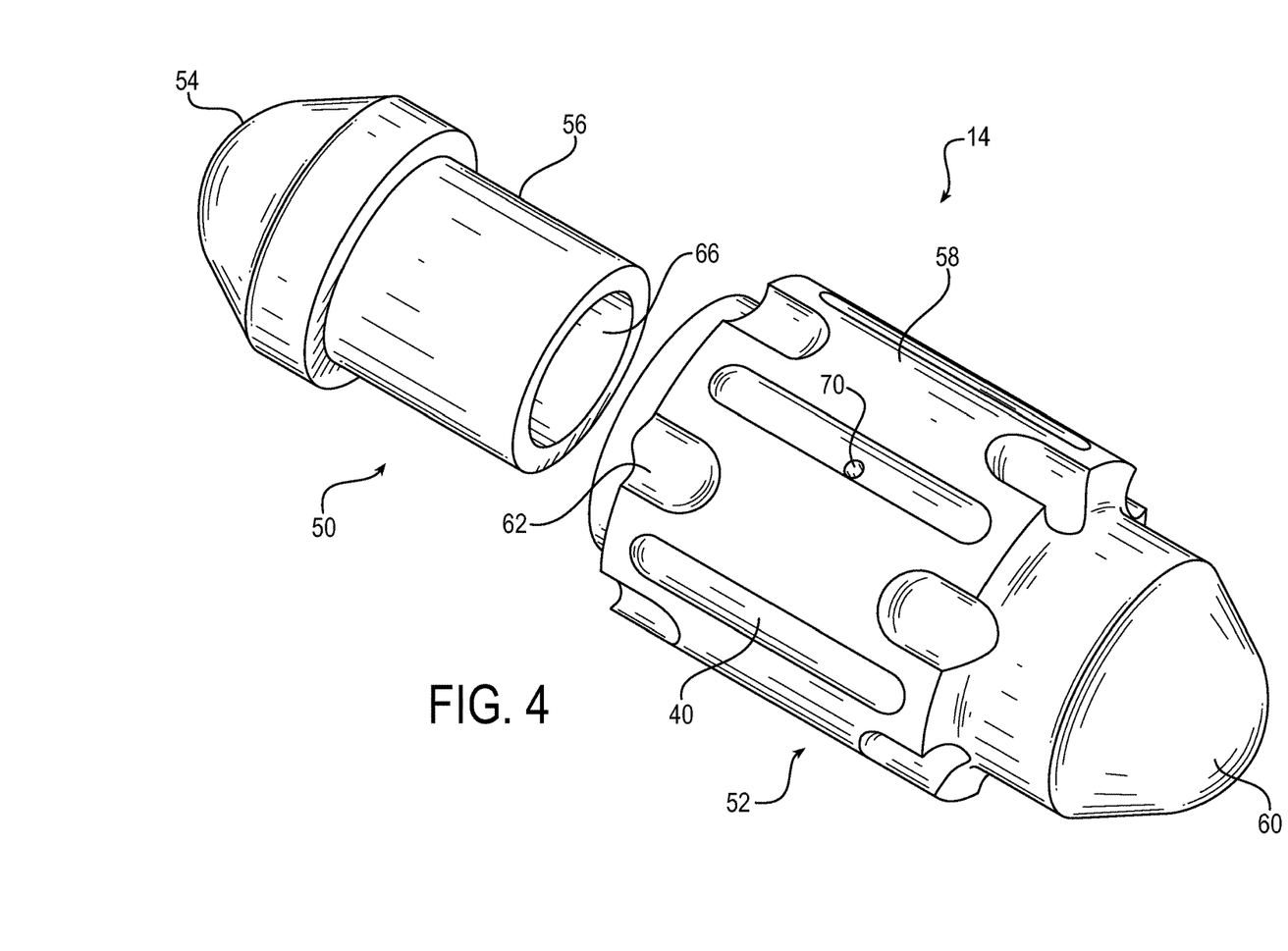
FIG. 4 is a drawing depicting a second exploded perspective view of the moveable member of FIG. 2, from the opposite viewpoint of FIG. 3.
Figure 5:
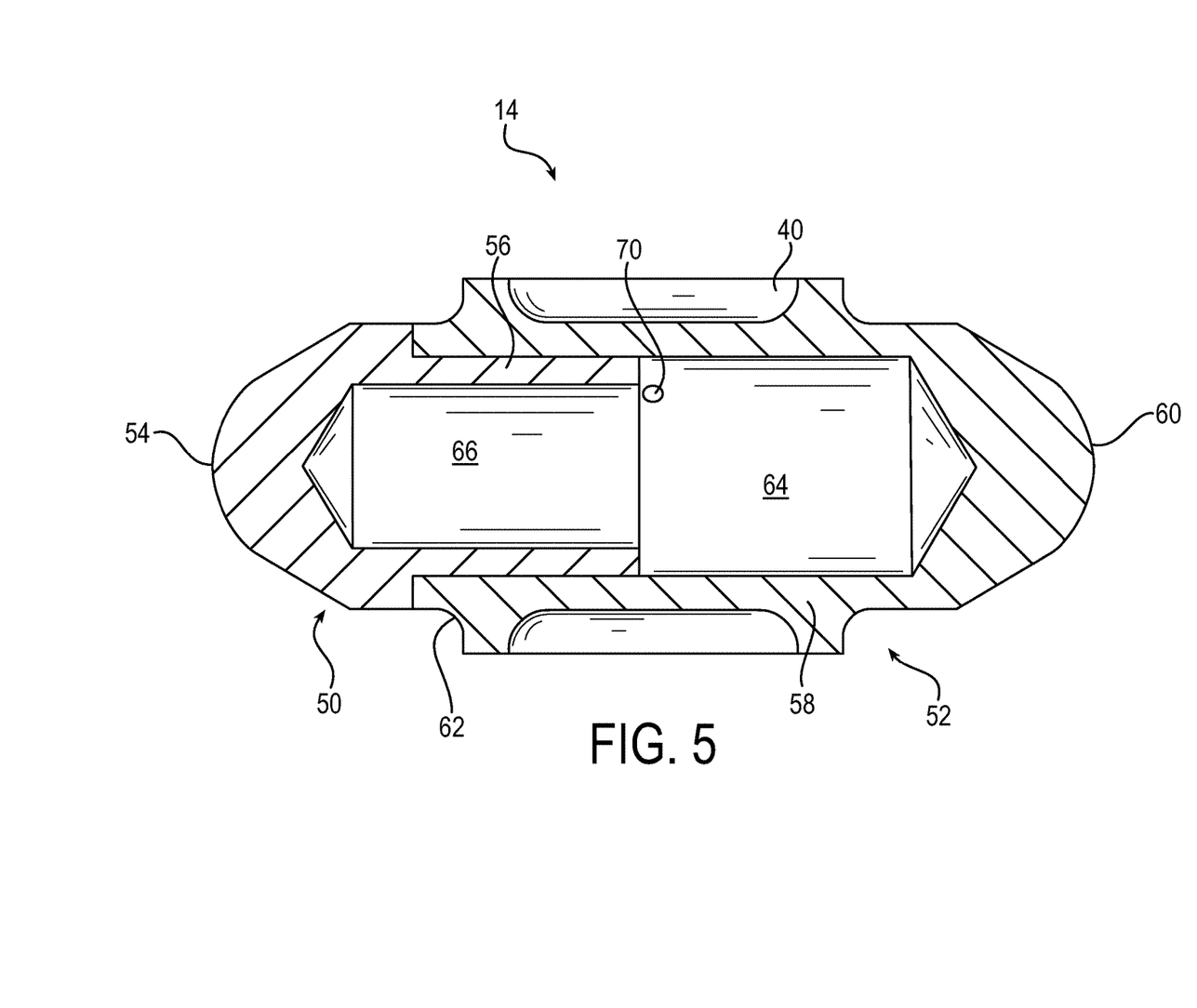
FIG. 5 is a drawing depicting a side cross-sectional view of the exemplary moveable member for use in the shuttle valve of FIG. 1.

The moveable member 14 has additional features that improve the performance of the shuttle valve. Such features are best seen in FIGS. 3-5 showing various views of the moveable member 14. In particular, FIG. 3 is a drawing depicting an exploded perspective view of the moveable member of FIG. 2. FIG. 4 is a drawing depicting a second exploded perspective view of the moveable member of FIG. 2, from the opposite viewpoint of FIG. 3. FIG. 5 is a drawing depicting a side cross-sectional view of the exemplary moveable member for use in the shuttle valve of FIG. 1. Accordingly, like components are identified with common reference numerals in FIGS. 2-5.

As seen particularly in FIGS. 3-5, the moveable member 14 may include a first component 50 and a second component 52. The first component 50 may be a male component and the second component 52 may be a female component, and the male component is inserted into the female component. The first component 50 may include a first head portion 54 and a base portion 56. The first head portion 54 may interact with or contact against the first valve seat 20 of the valve body in the manner described above. The second component 52 may include a barrel portion 58 and a second head portion 60. The second head portion may interact with or contact against the second valve seat 22 of the valve body in the manner described above. The barrel portion 58 may include the pressure differential grooves 40 described above formed in an outer diameter of the barrel portion. The barrel portion 58 further may include additional notches 62. The notches 62 may enhance fluid flow from the valve fluid inlets to the valve fluid outlet in the forward flow state.

As seen in FIG. 3, the barrel portion 58 of the second component 52 generally is hollowed out to form a first hollow bore 64. The first hollow bore 64 may extend into the second head portion 60. Similarly, as seen in FIG. 4, the base portion 56 of the first component 50 generally is hollowed out to form a second hollow bore 66. The second hollow bore 66 may extend into the first head portion 54.

The cross-sectional view of FIG. 5 (see also FIG. 1) shows the manner by which the components of the moveable member 14 are fitted and joined together. Generally, the base portion 56 of the first or male component 50 is inserted into the barrel portion 58 of the second or female component 52. The two components may be secured together by a tight press-fit relationship, brazing, welding, use of adhesives, or any suitable means. As seen in FIG. 5, an outer diameter of the base portion 56 of the first component 50 is located against an inner diameter of the barrel portion 58 of the second component 52, with the first head portion 54 extending outwardly from the barrel portion 58. In addition, the base portion 56 extends only partially into first hollow bore 64 of the barrel portion 58. Furthermore, hollow bores 64 and 66 generally have a thickness or diameter substantially greater than thicknesses of the material of the first and second components of the moveable member. The result is that when the two components of the moveable member 14 are joined together, the moveable member 14 has a substantially hollow interior. Specifically, when the base portion of the male component is inserted into the barrel portion of the female component, the first and second hollow bores 64 and 66 join to form the hollow interior of the moveable member.

Configuring the moveable member with a substantially hollow interior has performance advantages. The moveable member needs to be able to move within the valve body with significant speed, and sometimes back and forth in rapid succession. The hollow nature of the moveable member reduces its mass for reduction in impacting shock loads induced by the moveable member stopping in the seat, as compared to a non-hollow configuration. This provides for easier movement for enhanced control of the fluid flow. In this regard, as referenced above many conventional shuttle valves are configured for fluid flow through the moveable member itself. In such configurations, a substantially hollow moveable member is not usable because the configuration of the flow paths through the moveable member would not be proper. The shuttle valve stabilization of the present invention, as described above, is achieved without directing fluid flow through the moveable member itself. This permits the moveable member to be made hollow so as to achieve the reduced mass advantages in contrast to conventional configurations.

As also depicted in FIGS. 1-5, the moveable member 14 may include a weep hole 70 that performs a pressure equalization function for equalizing pressure between the hollow interior and an exterior of the moveable member. Due to the multiple component nature of the moveable member 14, some leakage of fluid potentially can occur into the hollow interior. At sub-sea depths during operation, with such leakage the pressure is essentially equal as between the hollow interior of the moveable member and the external environment. The sub-sea depths of operation, however, are at a pressure many magnitudes greater than that of atmospheric pressure at the surface.

The pressure at depth can create a danger for maintenance performed at surface pressure. Sometimes for maintenance or replacement, the shuttle valve may be removed and taken to the surface. As the moveable member is brought toward the surface, the external environmental pressure decreases toward surface atmospheric pressure, whereas the enclosed hollow interior of the moveable member may tend to stay at the substantially greater depth pressure. If this pressure differential were not equalized, the enormous pressure retained in the hollow interior of the moveable member could present a danger of explosion. To eliminate such danger, the weep hole 70 provides a pathway for equalization of pressure between the hollow interior of the moveable member and the external environment at the exterior of the moveable member.

As described above, in the embodiments of FIGS. 3-5, the moveable member may be formed of separate components, such as a first male component and a second female component, with the male component being inserted into the female component. Forming the moveable member as two separate components, however, can have disadvantages in manufacturing. Such components typically may be joined together by conventional processing methods, whether permanent or semi-permanent, such as welding, brazing, press fit, shrink fit, threading, or like processes. Such additional processing adds to the complexity and cost of manufacturing. Machining capabilities also limit the ability to optimize the internal cavities of the two mating components for the greatest weight reduction and impact absorption.

Figure 6:
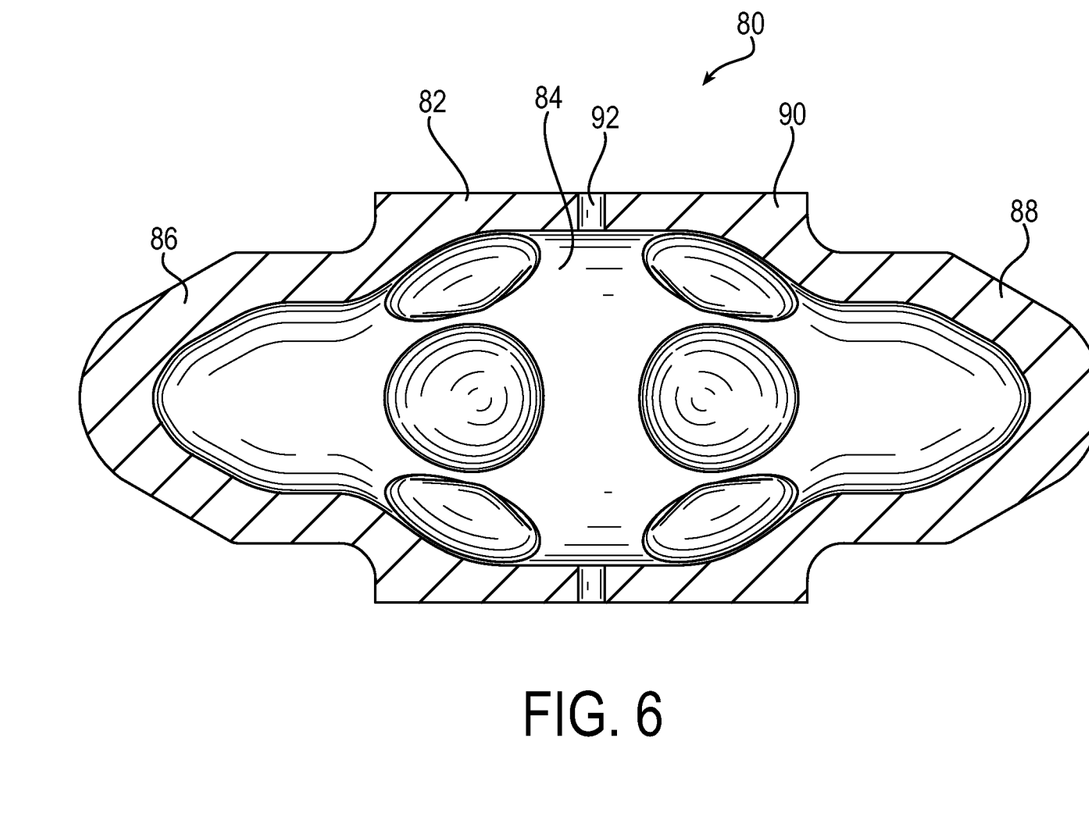
FIG. 6 is a drawing depicting a side cross-sectional view of another exemplary moveable member, having a unitary construction, for use in a shuttle valve in accordance with embodiments of the present invention.

As an alternative configuration, FIG. 6 is a drawing depicting a side cross-sectional view of another exemplary moveable member 80. In contrast to the previous embodiment, the moveable member 80 is configured having a unitary construction formed of a single component, rather than being formed of separate components that subsequently are joined together. In exemplary embodiments, the unitary construction is achieved using a three-dimensional (3D) printing process as are becoming more available and enhanced.

By forming the moveable member 80 using a 3D printing process to have a unitary construction, the manufacturing is optimized as to all features. In particular, the internal cavity of the moveable member can be formed to have the greatest weight reduction, performance, and impact absorption, while reducing cost insofar as limits of conventional machining processes are avoided. Engineering design optimization and weight reduction, implemented with 3D printing, leads to a cheaper moveable member, since printing processes generally are priced by weight and time. Applying 3D printing to the moveable member or like components, where weight reduction has an enormous effect on impact within the shuttle valve, in turn enhances life, longevity, and overall reliability of the valve and the valve components. The 3D printing manufacturing process and design techniques can be applied to a wide variety of applications, and the unitary construction thus has expanded the use of the principles of the present invention into fields and uses that previously have been unavailable.

The resultant configuration of the moveable member 80 manufactured by 3D printing otherwise may be comparable to that of the moveable member 14 as shown in FIG. 2. Looking more at the specific embodiment of FIG. 6, the moveable member 80 may include a unitary shell 82 that defines a shaped cavity 84. The cavity 84 may be shaped through 3D printing to conform to the grooves and notches formed into the moveable member that are detailed above. In this manner, the expanse of the hollow portion of the moveable member is maximized to provide the desired weight reduction, while maintaining effective performance. More specifically, the shell 82 of the moveable member may include a first head portion 86, a second head portion 88, and a barrel portion 90 between the first and second head portions, which define a substantially hollow interior constituting the shaped cavity 84. In this embodiment, the moveable member is configured to have a unitary construction formed of a single component, by which the unitary shell comprises the first head portion, the second head portion, and the barrel portion.

The moveable member 80 further may include a weep hole 92 that extends from an outer surface of the moveable member 80, through the shell 82 to the cavity 84. As described above, the weep hole 92 performs a pressure equalization function for equalizing pressure between the hollow interior and an exterior of the moveable member.

An aspect of the invention, therefore, is a shuttle valve. In exemplary embodiments, the shuttle valve includes a valve body comprising a first valve seat defining a first fluid inlet, a second valve seat defining a second fluid inlet, and a center portion that is connected to the first valve seat and the second vale seat, the center portion defining a fluid outlet and a bore. A moveable member is moveable within the bore between a first position against the first valve seat and a second position against the second valve seat, wherein when the moveable member is in the first position, the second fluid inlet is in fluid communication with the fluid outlet and when the moveable member is in the second position, the first fluid inlet is in fluid communication with the fluid outlet. The moveable member has at least one groove formed in an outer diameter portion of the moveable member, and during a reverse flow condition in which fluid flows from the fluid outlet, fluid flows into the at least one groove to bias the moveable member against either the first valve seat or the second valve seat.

In an exemplary embodiment of the shuttle valve, the shuttle valve further includes a first cavity and a second cavity in fluid communication with the fluid outlet. When the moveable member is in the first position, the second fluid inlet is in fluid communication with the second cavity to permit a reverse flow between the second cavity and the second fluid inlet, thereby creating a high velocity flow area at an end of the at least one groove adjacent the second fluid inlet. Further when the moveable member is in the first position, the moveable member blocks a reverse flow between the first cavity and the first fluid inlet, thereby creating a stagnant flow area at an end of the at least one groove adjacent the first fluid inlet. A pressure differential between the high velocity flow area and the stagnant flow area biases the moveable member against the first valve seat.

In an exemplary embodiment of the shuttle valve, when the moveable member is in the second position, the first fluid inlet is in fluid communication with the first cavity to permit a reverse flow between the first cavity and the first fluid inlet, thereby creating a high velocity flow area at the end of the at least one groove adjacent the first fluid inlet. Further when the moveable member is in the second position, the moveable member blocks a reverse flow between the second cavity and the second fluid inlet, thereby creating a stagnant flow area at the end of the at least one groove adjacent the second fluid inlet. A pressure differential between the high velocity flow area and the stagnant flow area biases the moveable member against the second valve seat.

In an exemplary embodiment of the shuttle valve, the first and second cavities are located in plane with a center axis of the fluid outlet and symmetrical to either side of the fluid outlet.

In an exemplary embodiment of the shuttle valve, the fluid outlet is perpendicular to the bore.

In an exemplary embodiment of the shuttle valve, the at least one groove extends less than an entire length of the outer diameter of the moveable member.

In an exemplary embodiment of the shuttle valve, the at least one groove comprises a plurality of grooves spaced equidistantly about a circumference of the moveable member.

In an exemplary embodiment of the shuttle valve, the number of grooves is six.

In an exemplary embodiment of the shuttle valve, the moveable member has a substantially hollow interior.

In an exemplary embodiment of the shuttle valve, the moveable member has a weep hole for equalizing pressure between the hollow interior and an exterior of the moveable member.

Another aspect of the invention is a moveable member for use in a shuttle valve. In exemplary embodiments, the moveable member includes a first head portion, a second head portion, and a barrel portion between the first and second head portions. The moveable member has at least one groove formed in an outer diameter of the barrel portion of the moveable member.

In an exemplary embodiment of the moveable member, the at least one groove extends less than an entire length of the outer diameter of the barrel portion of the moveable member.

In an exemplary embodiment of the moveable member, the at least one groove comprises a plurality of grooves spaced equidistantly about a circumference of the barrel portion of the moveable member.

In an exemplary embodiment of the moveable member, the number of grooves is six.

In an exemplary embodiment of the moveable member, the moveable member has a substantially hollow interior.

In an exemplary embodiment of the moveable member, the moveable member has a weep hole for equalizing pressure between the hollow interior and an exterior of the moveable member.

In an exemplary embodiment of the moveable member, the moveable member includes a first component and a second component that are fitted together, wherein the moveable member has a substantially hollow interior.

In an exemplary embodiment of the moveable member, the first component is a male component and the second component is a female component, and the male component is inserted into the female component.

In an exemplary embodiment of the moveable member, the male component comprises a first head portion and a base portion, the base portion defining a first hollow bore, and the female component comprises a second head portion and a barrel portion, the barrel portion defining a second hollow bore. The base portion of the male component is inserted into the barrel portion of the female component, the first and second hollow bores joining to form the hollow interior of the moveable member.

In an exemplary embodiment of the moveable member, the first hollow bore extends into the first head portion, and the second hollow bore extends into the second head portion.

In an exemplary embodiment of the moveable member, the moveable member is configured to have a unitary construction formed of a single component.

In an exemplary embodiment of the moveable member, the moveable member is configured to have a unitary construction formed of a single component comprising the first head portion, the second head portion, and the barrel portion.

In an exemplary embodiment of the moveable member, the moveable member has a weep hole for equalizing pressure between the hollow interior and an exterior of the moveable member.

In an exemplary embodiment of the moveable member, the moveable member has at least one groove formed in an outer diameter of the second component of the moveable member.

In an exemplary embodiment of the moveable member, the at least one groove extends less than an entire length of the outer diameter of the second component of the moveable member.

In an exemplary embodiment of the moveable member, the at least one groove comprises a plurality of grooves spaced equidistantly about a circumference of the second component of the moveable member.

In an exemplary embodiment of the moveable member, the number of grooves is six.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shuttle valve comprising:
   a valve body comprising:
      a first valve seat defining a first fluid inlet,
      a second valve seat defining a second fluid inlet, and
      a center portion that is connected to the first valve seat and the second valve seat, wherein the center portion defines a fluid outlet and a bore; and
   a moveable member that is moveable within the bore between a first position against the first valve seat and a second position against the second valve seat, wherein when the moveable member is in the first position, the second fluid inlet is in fluid communication with the fluid outlet and when the moveable member is in the second position, the first fluid inlet is in fluid communication with the fluid outlet, and wherein the moveable member comprises:

a first component, and a second component comprising at least one longitudinal groove formed in an exterior surface of the second component, wherein the first component and the second component are fitted together, wherein the moveable member has a hollow interior, wherein the first component is a hollow male component and the second component is a hollow female component, and the hollow male component is inserted into the hollow female component.

2. The shuttle valve of claim 1, wherein:

the hollow male component comprises a first head portion and a base portion, the base portion defining a first hollow bore; and the hollow female component comprises a second head portion and a barrel portion, the barrel portion defining a second hollow bore, wherein the at least one longitudinal groove is formed in an exterior surface of the barrel portion of the hollow female component;

wherein the base portion of the hollow male component is inserted into the barrel portion of the hollow female component, the first and second hollow bores joining to form the hollow interior of the moveable member.

3. The shuttle valve of claim 2, wherein the first hollow bore extends into the first head portion, and the second hollow bore extends into the second head portion.

4. The shuttle valve of claim 2, wherein the moveable member has a weep hole for equalizing pressure between the hollow interior and an exterior of the moveable member.

5. The shuttle valve of claim 1, wherein the at least one longitudinal groove extends less than an entire length of the second component.

6. The shuttle valve of claim 1, wherein the at least one longitudinal groove comprises a plurality of longitudinal grooves spaced equidistantly about a circumference of the second component.

7. The shuttle valve of claim 1, wherein the second component comprises (i) a first portion having a first outer diameter, and (ii) a second portion having a second outer diameter that is smaller than the first outer diameter, and wherein the at least one longitudinal groove is formed in an exterior surface of the first portion having the first outer diameter.

* * * * *

UNITED STATES PATENT AND TRADEMARK OFFICE
CERTIFICATE OF CORRECTION

Page 1 of 1

PATENT NO. : 10,012,318 B2
APPLICATION NO. : 15/075853
DATED : July 3, 2018
INVENTOR(S) : Aaron Michael Morgan et al.

It is certified that error appears in the above-identified patent and that said Letters Patent is hereby corrected as shown below:

On the Title Page

Item (72), the inventorship should be amended to read as follows:
-- Aaron Michael Morgan, Richfield, OH (US), Kevin Lawrence Bresnahan, Avon Lake, OH (US); Tyler James Kooser, Newbury, OH (US); Bipin Goraksha Kashid, Strongsville, OH (US) --

Signed and Sealed this
Twenty-eighth Day of August, 2018

Andrei Iancu
*Director of the United States Patent and Trademark Office*